Patented Oct. 23, 1945

2,387,435

UNITED STATES PATENT OFFICE 2,387,435

PREPARATION OF AROMATIC ORTHO-DINITRILES

Maurice H. Fleysher, Buffalo, N. Y., assignor to Allied Chemical & Dye Corporation, a corporation of New York No Drawing. Application June 14, 1939, Serial No. 279,051

19 Claims. (Cl. 260—465)

This invention relates to a process for the preparation of aromatic ortho-dinitriles from the corresponding diamides. The invention relates particularly to the preparation of ortho-dinitriles of the benzene series, such as ortho-phthalodinitrile, from the corresponding diamides.

An object of the present invention is to furnish an efficient, economical and practical method of producing aromatic ortho-dinitriles in good yield and in substantially pure form.

Another object of the present invention is to provide a method of producing ortho-phthalodinitrile from ortho-phthalic acid diamide, which is economical, simple and safe to operate.

Other objects of the invention will in part be obvious and will in part appear hereinafter.

According to the present invention aromatic ortho-dinitriles are formed by dehydrating the corresponding diamides with phosphorus oxychloride in a liquid reaction medium comprising an organic tertiary base as an acid binding agent. The liquid reaction medium may consist of the organic tertiary base (or a mixture of organic tertiary bases) alone or in admixture with one or more organic liquids which are inert toward the reagents and the reaction products and which are miscible with the tertiary organic base to yield therewith mixtures which are liquid at the reaction temperatures. If the tertiary organic base is a liquid at the reaction temperatures, it may be used in sufficient amount to act as a liquid medium or diluent for the reaction as well as an acid binding agent. The invention is particularly applicable to the production of ortho-dinitriles of the benzene series, especially ortho-phthalodinitrile from ortho-phthalic acid diamide.

I have found, according to the present invention, that phosphorus oxychloride is a particularly advantageous dehydrating agent for converting the diamides of aromatic ortho-dicarboxylic acids to aromatic ortho-dinitriles. Thus, as compared with phosgene, one dehydrating agent proposed for such use, phosphorus oxychloride is a relatively non-volatile liquid which is free from the extreme toxicity of phosgene, and hence can be handled readily and safely without taking extreme precautionary measures. As compared with acetic anhydride, another dehydrating agent proposed for such use, it is much more efficient in that a much smaller quantity of phosphorus oxychloride is required to produce an equal yield of the dinitrile. For example, I have found that by treating ortho-phthalic acid diamide (hereinafter referred to as "phthalodiamide") with phosphorus oxychloride in an amount as small as one mol of phosphorus oxychloride per mol of phthalodiamide at a temperature not exceeding 165° C., and not exceeding 135° C. for any considerable period of time, in a liquid reaction medium consisting of an organic tertiary base, ortho-phthalodinitrile is produced economically and in good yield and without substantial formation of heterocyclic derivatives. This result is surprising in view of the fact that diamides of aromatic ortho-dicarboxylic acids tend to form stable heterocyclic derivatives, such as phthalimide and imino-phthalimidine, under the influence of strong dehydrating agents.

The invention is illustrated by the following specific examples. The parts are by weight and temperatures are in degrees centigrade.

*Example 1.*—175 parts of phthalodiamide are added to 705 parts of substantially pure dimethylaniline (setting point=2.33 to 2.42°) in a reaction pot equipped with a vent, an agitator, and with heating and cooling means. The resulting slurry is heated with continuous agitation to about 50° to 55°. While the temperature is held within these limits, 163 parts of $POCl_3$ are added during a period of about a half hour. The temperature of the reaction mixture is raised to about 70° to 80°, and maintained within these limits by intermittent heating. Within a half hour after the temperature first reaches 70°, a sudden spontaneous rise in temperature occurs, followed by a similarly rapid fall. The entire phenomenon generally requires altogether less than a half hour. External heating is discontinued during the spontaneous temperature rise, which may reach a maximum between 135° and 165°, and is resumed only when the temperature falls to between 70° and 80°. The mixture is then maintained between 70° and 80° until 3 hours have elapsed from the time at which 70° was first attained, prior to the spontaneous rise in temperature. The mixture is then cooled to about 50° to 55° and maintained at this temperature for 18 hours; reheated to between 70° and 80° for a period of one-half to one hour, then cooled to about 25° or a lower temperature. The reaction mass is poured into an agitated mixture of 1000 parts ice, 1000 parts water, and 350 parts of hydrochloric acid (spec. gr.=1.18) or 185 parts of 66° Bé. sulfuric acid. The resulting slurry is agitated for 2 hours in order to break up the lumps, then filtered, and the filter cake is washed with cold water until the washings are no longer acid to Congo red. The filter cake is dried in an oven at 80°. The melting point of the product is between 136° and 138°. It may be used as such, or further purified by recrystallizing from hot water or from a suitable organic solvent, or by steam or vacuum distillation. A high yield is obtained.

To recover dimethylaniline from the filtrate, sufficient alkali can be added to liberate the base from its salts which are present in the solution, and the liberated base may then be removed by the usual methods, e. g., decantation, steam distillation, etc.

*Example 2.*—A mixture of 1622 parts of dimethyl-aniline, dried over anhydrous sodium sulfate, and 403 parts of phthalodiamide is made in a dry vessel and is heated to 50°. To this agitated mixture 377 parts of $POCl_3$ are added during a period of from 2 to 3 hours, while the temperature of the reacting mass is maintained at 50°±5° by means of controlled cooling. When all of the $POCl_3$ has been added, the temperature of the continuously agitated mixture is gradually raised, during a period of about 2 hours to about 70° to 75° and is maintained within this temperature range for about 1 hour by heating or cooling as required. The mixture is then cooled to about 50° and agitated at this temperature for from 15 to 18 hours. The reaction mixture is then poured as a thin stream into an agitated mixture of 1950 parts of crushed ice, 750 parts of 20° Bé. muriatic acid and 1950 parts of water. The final temperature is generally between 17° and 23°. Agitation is continued in order to break up the lumps. The slurry is then filtered, and the filter cake is washed several times with small quantities of cold water until the filtrate is nearly colorless, and no longer shows an acid reaction to Congo red. The filter cake is then dried in an oven at 80°. A fluffy, yellowish, crystalline product results which melts at about 136°. A high yield is obtained.

Dimethylaniline may be recovered from the filtrate by the procedure disclosed in Example 1.

*Example 3.*—The same procedure is followed as in Example 2 except that, instead of employing the temperature conditions of Example 2, the reagents are mixed and agitated at from 20° to 30° for 64 hours. The reaction mixture is then poured into an acid-ice mixture, as in Example 2, and the phthalonitrile is recovered in a similar manner.

*Example 4.*—A similar procedure to that of Example 2 is followed, except that the phosphorus oxychloride is added while the reaction mixture is maintained between 90° and 110°. The mixture is held within this temperature range for 2 hours and is then heated at 135° for 4 hours. Thereafter the mixture is cooled and the product is isolated as in Example 2. This procedure gives a substantial saving in time of reaction. However, exothermic decomposition sometimes occurs at the relatively high temperatures of this example, resulting in charring and decreased yields. The procedure of this example is therefore somewhat less desirable than the procedures of Examples 1, 2 and 3.

Substantially the same results are obtained in the procedure of Example 4 if dimethylaniline is replaced by an approximately equimolecular quantity of tri-n-butylamine.

It will be realized by those skilled in the art that the invention is not limited to the details disclosed in the above specific examples, and that changes can be made without departing from the scope of the invention.

Thus, the process of the present invention may be used in general for the conversion of substituted or unsubstituted diamides of aromatic ortho-dicarboxylic acids to the corresponding dinitriles; for instance, those of the benzene, naphthalene, anthracene or heterocyclic aromatic series (e. g., naphthalene-1:2- and -2:3-dicarboxyamides). The aromatic ortho-diamides may contain, as nuclear substituents, such groups as alkyl, aralkyl, aryl, cycloalkyl, halogen, nitro, alkoxy, or ketonic carbonyl groups. The process is particularly applicable to phthalodiamide and its homologues and substitution products; such as, 4-chlor- or 4-brom-phthalodiamide, 3-nitrophthalodiamide, tetrachlor-phthalodiamide, etc.

In carrying out the process of the present invention, at least 4 molecular equivalents, and preferably from 5 to 6 equivalents, of the organic tertiary base are employed per mol of $POCl_3$ in order to bind or neutralize all of the acids produced in the reaction. Lower proportions of the base cause lowering of the yield; greater proportions may be used, but merely increase the cost of the process. While the organic tertiary base is preferably used alone as a medium for the reaction, inert organic liquids which are miscible with the said base also may be present in the reaction mixture. In order to maintain the reaction mixture substantially in the liquid phase, the mixture of the organic tertiary base with the inert organic diluent—or the organic tertiary base itself if used alone—must be liquid at the temperatures employed in the reaction, and is preferably a solvent for the reagents and products of the reaction. In order to maintain the reaction mass sufficiently fluid and dilute, at least 4 parts by weight of the organic tertiary base, or of its mixture with an inert organic solvent, are preferably employed per part by weight of the ortho-aromatic diamide.

The term, "organic tertiary base" is used herein to designate tertiary amines of the aliphatic, cycloaliphatic, and aromatic series, and heterocyclic bases in which a tertiary nitrogen atom is a part of the heterocyclic ring. In the process of the present invention, tertiary amines are preferably employed which bind or neutralize the acids generated in the reaction but which are otherwise substantially unreactive. In order to avoid considerably lowered yields, it is preferred to use tertiary amines which are substantially free from secondary amines. Suitable organic tertiary bases are, for instance, dimethylaniline, diethylaniline, dimethyl toluidine, diethyl toluidine, tri-n-butylamine, pyridine, and quinoline. Inert organic diluents which may be used in conjunction with the organic tertiary bases are, for example, benzene, chloro-benzene, nitrobenzene, toluene, and kerosene.

The amount of phosphorus oxychloride employed may be varied. In the preferred practice of the invention about 1 mol of phosphorus oxychloride is used for each mol of the ortho-aromatic diamide. A greater amount of phosphorus oxychloride may be used, although it is generally unnecessary and wasteful, requiring a corresponding excess of the organic tertiary base. While lesser amounts of phosphorus oxychloride also may be used, any substantial reduction in the aforesaid preferred proportions will result in considerably lowered yields. Proportions lower than 0.8 mol of phosphorus oxychloride for each mol of ortho-aromatic diamide are generally unsatisfactory.

In general, satisfactory results are obtained if the phosphorus oxychloride is added slowly to an agitated mixture of the ortho-aromatic diamide and the organic tertiary base while maintaining the temperature between 20° and 110° C. The addition of phosphorus oxychloride to the mixture at temperatures above 120° C. ordinarily should be avoided, since above this temperature there is an appreciable formation of iminophthalimidine from phthalodiamide, or of corresponding heterocyclic derivatives from diamides of other aromatic ortho-dicarboxylic acids. Temperatures between 90° and 110° C. during the addition of the phosphorus oxychloride often give good results, but the reaction tends to be unstable and sometimes exothermic decomposition occurs that causes lowered yields of dinitrile. For simplicity of operation and uniformity of results in a reasonable time, temperatures between 45° and 75° C. are preferred.

After the phosphorus oxychloride is added, the reaction is allowed to proceed to completion, preferably while agitating the reaction mixture. The temperature at which the reaction mixture is maintained to bring it to completion also may be varied. While temperatures from 135° C. to 165° C. may be attained for a short period of time when the rate of the exothermic reaction reaches a peak, as illustrated in Example 1, the mixture is preferably not maintained within this range for any considerable period, for example, not substantially longer than about a half hour. When the temperature begins to rise spontaneously, external heating is preferably discontinued and only resumed when the temperature falls again to the desired level. The spontaneous rise in temperature may be avoided by suitably controlled cooling, as illustrated in Example 2. For simplicity of operation and uniformity of results in a reasonable time, temperatures between 50° and 80° C. are preferred for this step. As disclosed above, lower temperatures (for example, 20° C.) are satisfactory but require a correspondingly longer period for completion of the reaction. Temperatures as high as 135° C. may be used and will decrease the time necessary for the reaction, but may result in exothermic decomposition and correspondingly lowered yields and contamination of the product.

After the reaction is completed, the dinitrile can be recovered in any suitable way. When following the procedure of the above examples, namely, drowning the reaction mixture in a mixture of ice, water and mineral acid, sufficient strong mineral acid should be used to neutralize the excess organic base which has not been neutralized by the acid formed in the reaction. Mineral acids used for this purpose are preferably those which form readily water-soluble salts with the organic tertiary base, and which do not react to any appreciable extent with the aromatic dinitrile. Such acids may be, for example, hydrochloric acid, phosphoric acid or sulfuric acid. While a considerable excess of the mineral acid may be employed in the drowning solution, sufficient water is preferably used to prevent the mineral acid normality from exceeding a value of 2.0; and the temperature of the drowned mixture is preferably not permitted to exceed 25° C. to any substantial extent, since mineral acid solutions at higher concentrations and temperatures tend to hydrolyze the nitrile and thus reduce the yield. The dinitrile, precipitated as a slurry in the liquid, may be separated as a filter cake by filtration, washed with cold water, and dried.

The dinitrile produced is in a good state of purity. It may be further purified in any suitable way; as by distillation in steam or in vacuo, or by recrystallization from hot water or from a suitable organic solvent (for example, benzene, chlorbenzene, nitrobenzene, alcohol, or glacial acetic acid).

When water-insoluble inert organic liquids or solvents are present in the reaction mixture, they may be precipitated together with the aromatic dinitrile, after the reaction is complete, by drowning the mixture in cold aqueous mineral acid in the manner hereinbefore described. The aqueous portion of the resulting mixture, which contains the mineral acid salt of the tertiary base, may be separated from the nonaqueous portion containing the organic liquid or solvent and the aromatic dinitrile, by decantation or other suitable method. The aromatic dinitrile may be recovered by distillation or evaporation of the organic liquid or solvent, or by crystallization of the aromatic dinitrile and separation thereof in the form of a filter cake, from the non-aqueous portion of the drowned mixture. The aromatic ortho-dinitrile then may be purified by the methods of the preceding paragraph.

I claim:

1. A process of producing an aromatic orthodinitrile which comprises reacting the corresponding diamide with phosphorus oxychloride in a liquid reaction medium comprising an organic tertiary base.

2. A process of producing an aromatic orthodinitrile which comprises reacting the corresponding diamide with phosphorus oxychloride at a temperature not higher than 165° C. in a liquid reaction medium comprising an organic tertiary base.

3. A process of producing an aromatic orthodinitrile which comprises reacting the corresponding diamide with phosphorus oxychloride at a temperature not higher than 165° C. in a liquid reaction medium comprising a tertiary aromatic amine in an amount at least sufficient to neutralize the acids formed in the reaction.

4. A process of producing an aromatic orthodinitrile which comprises reacting the corresponding diamide with phosphorus oxychloride at a temperature not higher than 165° C. in a liquid reaction medium comprising a tertiary heterocyclic nitrogenous base in an amount at least sufficient to neutralize the acids formed in the reaction.

5. A process of producing an aromatic orthodinitrile which comprises reacting the corresponding diamide with phosphorus oxychloride at a temperature not higher than 165° C. in a liquid reaction medium comprising a tertiary aliphatic amine in an amount at least sufficient to neutralize the acids formed in the reaction.

6. A process of producing ortho-phthalodinitrile which comprises reacting ortho-phthalic acid diamide with phosphous oxychloride in a liquid reaction medium comprising an organic tertiary base.

7. A process of producing ortho-phthalodinitrile which comprises reacting ortho-phthalic acid diamide with phosphorus oxychloride in the presence of a liquid reaction medium comprising an organic tertiary base in an amount at least sufficient to neutralize the acids formed in the reaction.

8. A process of producing ortho-phthalodinitrile which comprises reacting ortho-phthalic acid diamide with phosphorus oxychloride at a temperature not higher than 165° C. in the presence of a liquid reaction medium comprising an organic tertiary base in an amount at least sufficient to neutralize the acids formed in the reaction.

9. A process of producing ortho-phthalodinitrile which comprises reacting ortho-phthalic acid diamide with at least 0.8 mol of phosphorus oxychloride for each mol of the diamide at a temperature not higher than 165° C. in the presence of a liquid reaction medium comprising an organic tertiary base in an amount at least sufficient to neutralize the acids formed in the reaction.

10. A process of producing ortho-phthalodinitrile which comprises reacting ortho-phthalic acid diamide with at least 0.8 mol of phosphorus oxychloride for each mol of the diamide at a temperature which does not exceed 165° C., and which does not exceed 135° C. for a period substantially longer than a half hour, in the presence of a liquid reaction medium comprising an organic tertiary base in an amount at least sufficient to neutralize the acids formed in the reaction.

11. A process of producing ortho-phthalodinitrile which comprises adding at least 0.8 mol of phosphorus oxychloride to a mixture of one mol of ortho-phthalic acid diamide and a liquid reaction medium comprising an amount of an organic tertiary base at least sufficient to neutralize the acids formed in the resulting reaction, maintaining the temperature of the mixture below 120° C. during the addition of phosphorus oxychloride, and completing the reaction by maintaining the resulting reaction mixture at a temperature which, for any considerable period of time, does not exceed 135° C.

12. A process of producing ortho-phthalodinitrile which comprises adding at least 0.8 mol of phosphorus oxychloride to a mixture of one mol of ortho-phthalic acid diamide and a liquid reaction medium comprising an amount of an organic tertiary base at least sufficient to neutralize the acids formed in the resulting reaction, maintaining the temperature of the mixture between 20° and 110° C. during the addition of the phosphorus oxychloride, and completing the reaction by maintaining the resulting reaction mixture at a temperature which, for any considerable period of time, does not exceed 135° C.

13. A process of producing ortho-phthalodinitrile which comprises adding at least 0.8 mol of phosphorus oxychloride to a mixture of one mol of ortho-phthalic acid diamide and a liquid reaction medium comprising an amount of an organic tertiary base at least sufficient to neutralize the acids formed in the resulting reaction, maintaining the reaction mixture at temperatures between 20° and 75° C. during the addition of the phosphorus oxychloride, and completing the reaction by maintaining the resulting reaction mixture at temperatures above 20° C., but not exceeding 80° C. for any considerable period of time.

14. A process of producing ortho-phthalodinitrile which comprises adding at least 0.8 mol of phosphorus oxychloride to a mixture of one mol of ortho-phthalic acid diamide and a liquid reaction medium comprising an amount of a tertiary aromatic amine at least sufficient to neutralize the acids formed in the resulting reaction, maintaining the temperature of the mixture between 45° and 75° C. during the addition of the phosphorus oxychloride, and completing the reaction by maintaining the resulting reaction mixture at temperatures above 50° C., but not exceeding 80° C. for any considerable period of time.

15. A process of producing ortho-phthalodinitrile which comprises adding at least 0.8 mol of phosphorus oxychloride to a mixture of one mol of ortho-phthalic acid diamide and a liquid reaction medium comprising an amount of a tertiary heterocyclic nitrogenous base at least sufficient to neutralize the acids formed in the resulting reaction, maintaining the temperature of the mixture between 45° and 75° C. during the addition of the phosphorus oxychloride, and completing the reaction by maintaining the resulting reaction mixture at temperatures above 50° C., but not exceeding 80° C. for any considerable period of time.

16. A process of producing ortho-phthalodinitrile which comprises adding at least 0.8 mol of phosphorus oxychloride to a mixture of one mol of ortho-phthalic acid diamide and a liquid reaction medium comprising an amount of a tertiary aliphatic amine at least sufficient to neutralize the acids formed in the resulting reaction, maintaining the temperature of the mixture between 45° and 75° C. during the addition of the phosphorus oxychloride, and completing the reaction by maintaining the resulting reaction mixture at temperatures above 50° C., but not exceeding 80° C. for any considerable period of time.

17. A process of producing ortho-phthalodinitrile which comprises adding about one mol of phosphorus oxychloride to a mixture of one mol of ortho-phthalic acid diamide in admixture with dimethylaniline in an amount by weight about 4 times the weight of the diamide, maintaining the temperature of the mixture below 120° C. during the addition of the phosphorus oxychloride, and completing the reaction by maintaining the resulting reaction mixture at a temperature above 50° C., but not exceeding 135° C. for a period substantially longer than a half hour.

18. A process of producing ortho-phthalodinitrile which comprises adding about one mol of phosphorus oxychloride to a mixture of one mol of ortho-phthalic acid diamide in admixture with dimethylaniline in an amount by weight about 4 times the weight of the diamide, maintaining the temperature of the mixture between 20° and 110° C. during the addition of the phosphorus oxychloride, and completing the reaction by maintaining the resulting reaction mixture at a temperature below 135° C.

19. A process of producing ortho-phthalodinitrile which comprises adding about one mol of phosphorus oxychloride to a mixture of one mol of ortho-phthalic acid diamide in admixture with dimethylaniline in an amount by weight about 4 times the weight of the diamide, maintaining the temperature of the mixture between 45° and 75° C. during the addition of the phosphorus oxychloride, and completing the reaction by maintaining the resulting reaction mixture at a temperature above 50° C., but not exceeding 80° C. for a period substantially longer than a half hour.

MAURICE H. FLEYSHER.